H. T. BELLAMY AND J. C. SMITH.
PROCESS OF AND APPARATUS FOR DRAWING GLASS.
APPLICATION FILED DEC. 26, 1917.

1,303,452.

Patented May 13, 1919.
3 SHEETS—SHEET 1.

Inventors
Harry Tristram Bellamy
Jesse Conrad Smith by J. E. Roberts
Atty.

UNITED STATES PATENT OFFICE.

HARRY TRISTRAM BELLAMY, OF OAK PARK, ILLINOIS, AND JESSE CONRAD SMITH, OF NEW YORK, N. Y., ASSIGNORS TO WESTERN ELECTRIC COMPANY, INCORPORATED, OF NEW YORK, N. Y., A CORPORATION OF NEW YORK.

PROCESS OF AND APPARATUS FOR DRAWING GLASS.

1,303,452.      Specification of Letters Patent.      Patented May 13, 1919.

Application filed December 26, 1917. Serial No. 208,926.

*To all whom it may concern:*

Be it known that we, HARRY TRISTRAM BELLAMY and JESSE CONRAD SMITH, citizens of the United States, residing at Oak Park, in the county of Cook and State of Illinois, and at New York, in the county of New York and State of New York, respectively, have invented certain new and useful Improvements in Processes of and Apparatus for Drawing Glass, of which the following is a full, clear, concise, and exact description.

This invention relates to a process of and apparatus for drawing glass, and more particularly to a process of and apparatus for drawing and forming thin walled glass articles.

The manufacture of thin walled metallic articles by drawing and forming is a well known and simple operation. However, due to the peculiar properties of glass, it has been impossible to subject it to like operations for the production of thin walled glass articles, such as tubes, vials, etc.

The difficulty encountered in drawing glass resides principally in the fact that glass will crank when suddenly converted from the plastic to the solid state. To avoid the sudden cooling of the glass in the drawing operation, due to contact with the drawing tools, it has been proposed to heat the tools, but here again trouble is encountered because of the property of glass, by virtue of which it will firmly adhere to the tools when the temperature of said tools is raised above a certain maximum. Because of these difficulties in the drawing and forming of glass, it has been the general practice to blow all forms of thin walled glass articles.

One of the objects of this invention resides, therefore, in the production of an improved process whereby contact between the glass and the forming tools can be regulated and controlled so that thin walled glass articles can be readily drawn from plastic glass.

Another object resides in the production of an improved apparatus comprising means whereby the glass will be drawn and accurately formed and in which momentary contact only will exist between the drawn plastic glass article and both the mold or die and the punch or ram.

Further objects consist in the production of improved means for instantaneously cutting the formed article from the plastic glass mass as soon as said article is formed; for rapidly stripping the article from the punch or ram after it is formed; of an improved punch and die mechanism, and other features to be described in the following description and more specifically pointed out in the appended claims.

The invention is illustrated in the accompanying drawings, in which.

The invention in its preferred form as herein illustrated and described has been adapted to the drawing of the glass bulbs used to inclose the filaments in miniature incandescent lamps, as, for example, the lamps used for signal lights in telephone switchboards. These lamp bulbs must be accurately drawn to certain definite dimensions as to exterior and interior diameters and uniformity of thickness of the glass walls throughout its length. The invention is not limited, however, to the specific embodiment herein illustrated and described, but comprises within its scope many variations and applications, as outlined in the appended claims.

The lamp bulb drawing machine illustrated in the drawings comprises a suitable machine bed plate 10 which is mounted on convenient standards such as 11. Any suitable driving means, such as the electric motor 12, is secured to the bed plate 10. A pulley 13 is attached to the shaft 14 of the motor, the pulley 13 carrying a belt 15 which coöperates with a pulley 16. The pulley 16 is secured to a shaft 17 journaled in bearings fastened to the lower side of the bed plate 10 by means of brackets such as 18, said shaft 17 also carrying a pulley 19. The pulley 19 drives a belt 23 which coöperates with a second pulley 24 secured to a shaft 25, the shaft 25 carrying any suitable type of clutch mechanism (not shown) which may be tripped by a rod such as 26 to connect the crank 27 to the rotating shaft 25. It will consequently be evident that power will be transmitted from the rotating shaft 14 of the motor, by means of the pulleys hereinbefore described and the belts 5 and 23, to the shaft 25 and thence to the crank 27. Obviously any other type of power transmitting means may be utilized in place of the mechanism just described.

The crank 27 carries a pitman 28 which is given one complete reciprocation for each complete revolution of the crank 27. The clutch mechanism coöperating between the shaft 25 and the crank 27 is controlled by the operator by means of the treadle 29. The treadle 29 is integral with a rod 30, said rod and treadle being held in an elevated position by means of the spiral spring 33. The rod 30 is rigidly fastened to the cylindrical rod 34, to which in turn is rigidly secured a sleeve 38, integral with which is a link 39 pivotally secured by a screw 37 to the vertically extending rod 35 the upper end of which carries the catch 36. The catch 36 coöperates with the pin or rod 26 to trip the clutch mechanism. Any suitable type of clutch controlling mechanism may obviously be utilized in which, as in the preferred embodiment illustrated and described above, the depression of the treadle 29 will, through suitable means, operate the clutch and permit the crank 27 to make one complete revolution.

Figure 1:
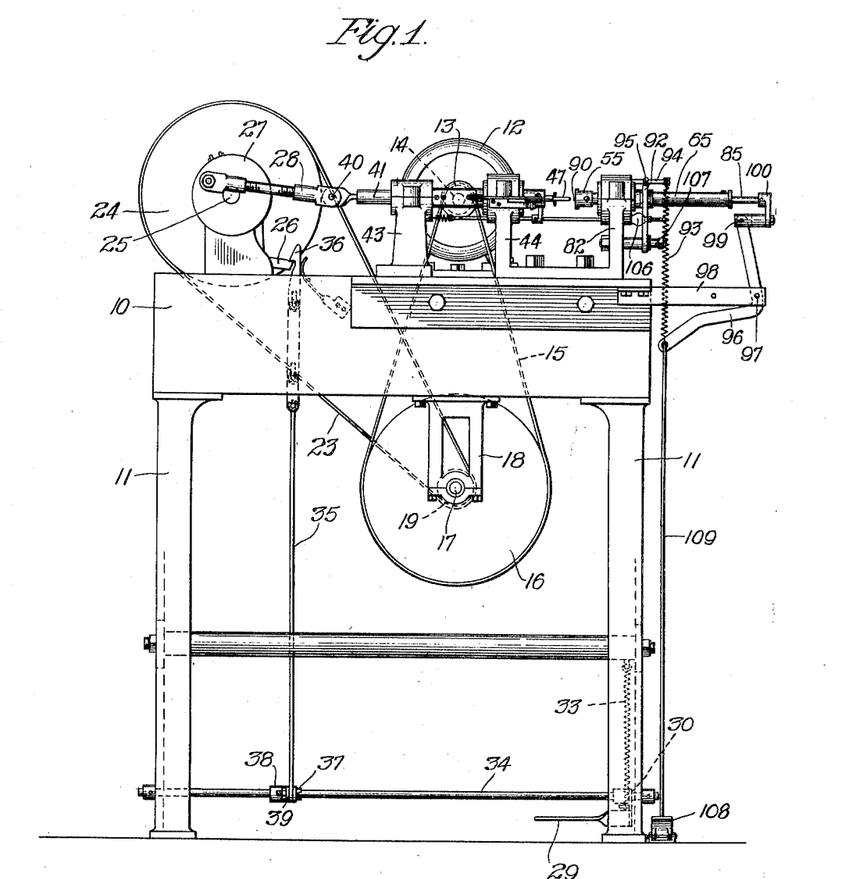
Figure 1 is a front elevation of the complete machine.
Figure 2:
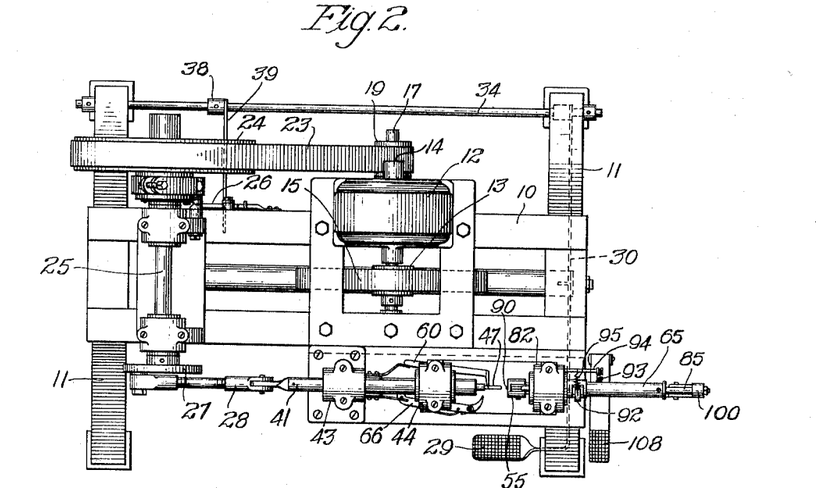
Fig. 2 is a plan view thereof.

In the preferred form, as illustrated in Fig 1, the depression of the treadle 29 will rotate the rod 34, which in turn will pull down the rod 35 through the link 39 which is pivotally secured to the said rod 35. This movement of the rod 35 will depress the pin 26 and operate the clutch mechanism. When the operator releases the treadle 29, the spring 33 will return it and the associated mechanism to normal, and the pin 26 will thereupon operate the clutch mechanism to disengage the shaft 25 from the crank 27 after the completion of one rotation of said crank.

Figure 3:
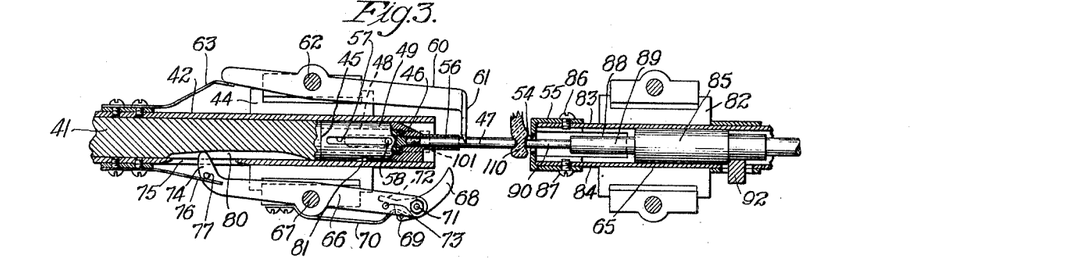
Fig. 3 is an enlarged detailed plan view, partly in section, of the glass drawing and forming mechanism in position just prior to drawing the plastic glass through the die.
Figure 4:
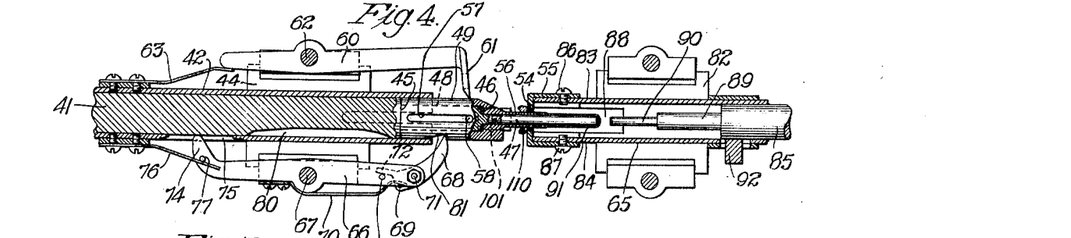
Fig. 4 is a similar view showing this apparatus in position after the glass article is formed.
Figure 5:
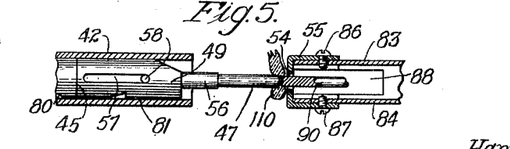
Fig. 5 is an enlarged detailed plan view, partly in section, showing the position of the ram and pad just prior to the time that the pad is retracted.
Figures 6, 7, 9:
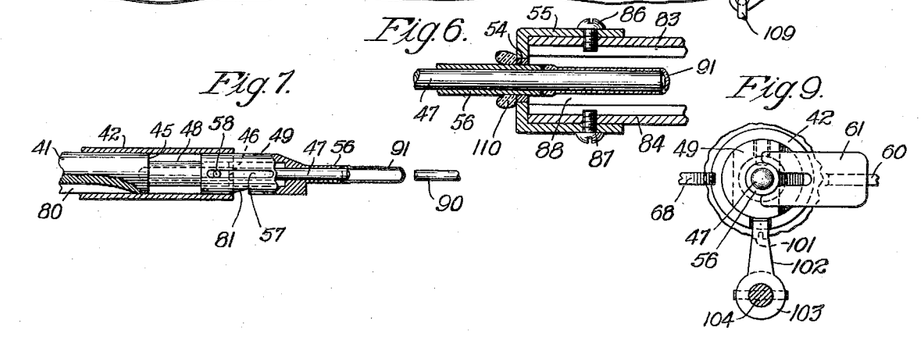
Fig. 6 is an enlarged detailed plan view, partly in section, and illustrates the mechanism for cutting the formed glass article from the superfluous plastic glass mass from which it is formed.
Fig. 7 is an enlarged plan view, partly in section, showing the mechanism used for stripping the formed glass article from the ram.
Fig. 9 is a view of the ram and its associated apparatus taken on the line 9—9 of Fig. 8.

Pivotally secured to the pitman 28 by means of the pin 40 is the reciprocating rod 41 which reciprocates in a sleeve 42 carried by the standards 43 and 44. As indicated in Figs. 3, 4, and 7, the rod 41 is reduced in diameter at 45, the reduced portion 48 thereof not contacting with the sleeve 42. Said rod is again reduced in diameter at 46, the reduced portion 47 thereof constituting the ram or punch of the machine. This punch is rounded at the end and is slightly tapered and has a diameter which is equal to the interior diameter of the glass bulb which is to be formed. Loosely fitted on the first reduced cross-sectional area 48 of the rod 41 is a sleeve 49 which is lapped to snugly fit the section 48 of the rod and which is secured to said section 48 so that the rod can be moved independently of said sleeve 49, as hereinafter described. The forward exterior end 56 of this sleeve 49 is reduced in diameter to equal substantially the outside diameter of the glass bulb which is to be formed and also the diameter of the circular opening 54 in a die 55. This forward end 56 of said sleeve has a reduced interior diameter which fits snugly over the exterior of the punch or ram 47. The sleeve 49 is equipped with an elongated slot 57 in which rides a pin 58 secured to the portion 48 of the rod 41. This pin is utilized as the propelling means for the sleeve 49. When the rod 41 is advanced, the pin 58 will ride in the slot 57 and the sleeve 49 will not advance with the rod 41 and its associated ram 47 during the first part of the forward movement of each reciprocation. However, when the rod 41 has advanced to the position illustrated in Fig. 5, the pin 58 contacts with the right end of the elongated slot 57, and the sleeve 49, rod 41, and ram or punch 47 are all advanced together. It will be evident that on the return stroke of the reciprocation, the rod 41 and ram 47 will move independently of the sleeves 49 and 56 for the initial portion of said movement and until the pin 58 has moved to the extreme left end of the slot 57. When the pin 58 strikes this end of the slot 57, it will retract the sleeve 49 with the rod 41 and the ram 47. This connection between the rod 41 and the sleeve 49 permits the ram 47 to move forward independently of the sleeve 49 for a certain definite amount of the forward stroke of each reciprocation and likewise to retract a similar amount on the return stroke of each reciprocation independently of the sleeve 49.

Pivotally secured to the mounting standard 44 is the lever 60, the front end of which carries a downwardly extending bifurcated arm 61. The lever 60 is pivoted about the pin 62 and the bifurcated end 61 thereof is maintained in slidable contact with the outer peripheries of the sleeves 49 and 56 and the ram 47 by means of the flat spring 63 secured to the sleeve 42 as the sleeves and ram are reciprocated to and fro. The forward extending portion of the sleeve 49 rides under the left end of the lever 60, thereby maintaining the bifurcated portion 61 of said lever in yielding contact with said sleeve and ram. The lower ends of the bifurcations of the arm 61 are arcuated, as clearly shown in Fig. 9, so as to conform to the circumferential surface of the portion 56 of the sleeve 49. This lever 60 and its bifurcated end 61 is used as a stripper fork to remove or strip from the sleeve and ram, during the return stroke of the reciprocation, the excess of plastic glass which forms about said sleeve and ram after the glass bulb has been completely formed and severed from the mass of plastic glass from which it is drawn.

Mounted on the standard 44 directly opposite to the lever 60 and on the opposite side of the sleeve 42 is a second lever 66 which is pivotally mounted on the standard by means of the pin 67. This lever 66 carries at its front end a pawl 68 carrying a pin 69 which coöperates with a spring 70 mounted on the lever 66, said spring serving to turn said pawl about its pivot 71 in a counter-clockwise direction until the rearwardly extending finger 72 of said pawl strikes a stop or retaining pin 73 which is mounted on the lever 66. The left-hand end of the lever 66 carries a downwardly extending arm 74 fitted with a rounded end which rides on the circumferential surface of the rod 41 through a slot 75 which is cut in the sleeve 42. The end of the downwardly extending arm 74 is held in contact with the outer periphery of the rod 41 by means of a spring 76 which is secured to the sleeve 42 and the end of which rides over a pin 77 secured to the lever 66. The spring 76, therefore, functions to hold the arm 74 in yielding contact with the peripheral surface of the rod 41. The rod 41 is fitted with a recess 80 in which the arm 74 rides during the major portion of the period that said rod is engaged in the forward movement of a reciprocation. (See Fig. 3). Just prior to the time that the rod reaches the end of the forward movement of the reciprocation the arm 74 leaves the recess 80, riding up the inclined surface thereof against the force exerted by the spring 76 until the arm 74 reaches the outer peripheral surface of the rod 41. At this time the pawl 68 is held in yielding engagement, because of the spring 70, with the outer peripheral surface of the sleeve 49, the spring 70 tending to move the pawl 68 in a counter-clockwise direction. As the rod 41 advances, a catch 81 cut in to the peripheral surface of the sleeve 49 is moved under the front end of the pawl 68, and the pawl 68 will drop into said catch under the force exerted by the spring 70. The pawl 68 and its coöperating catch 81 will be moved into the position shown in Fig. 4, in which the pawl 68 falls into the catch 81, at the moment that the ram 47 has completed the forward stroke of a reciprocation. When the rod 41 and ram 47 begin the backward movement on the return stroke of a reciprocation, the pawl 68 riding in the catch 81 will hold the sleeve 49 and prevent its return movement with the rod 41. However, as the rod 41 is retracted, the arm 74 will again ride in the recess 80 cut in the outer peripheral surface of said rod, and the lever 66, under the influence of the spring 76, will turn said lever about its pivot 67, and when said arm 74 reaches the lowest position of the recess 80, the lever 66 will have turned about its pivot sufficiently to remove the pawl 68 from the catch 81. At this time the pin 58 in the rod 41 will have reached the left end of the elongated slot 57, and the rod will therefore carry the sleeve 49 with it in its continued retraction.

Secured on the bed 10 at the right end of the machine is another mounting standard 82 on which is rigidly mounted a sleeve 65 integral with which are the forwardly extending vertical plates 83 and 84 which are equipped with an interior circumferential surface in which a cylindrical rod 85 is loosely fitted. Secured to the plates 83 and 84 by means of the screws 86 and 87 is the die 55. The vertical plates 83 and 84 provide a housing which has openings such as 88 at the top and bottom, into which the ram 47 is projected as it is forced through the opening 54 in the die 55. The die 55, which coöperates with the ram 47, comprises a flat disk containing at its center a circular hole which is equal to the outside diameter of the glass bulb which is to be formed and substantially equal in diameter to the forward cylindrical portion 56 of the sleeve 49. The center line of the hole 54, the die 55, the ram 47, and the sleeve 49 are obviously all in alinement.

Figure 10:
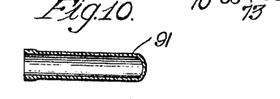
Fig. 10 is a longitudinal sectional view of a finished glass lamp bulb.

The cylindrical rod 85 which is slidably fitted in the sleeve 65 and in the vertical side walls 83 and 84 contains a forwardly extending cylindrical rod 89 of reduced cross-sectional area, integral with which is a second forwardly extending cylindrical rod 90 of still further reduced cross-sectional area. The rod 90 constitutes what may be termed a pad, and the front end of this pad is fitted with a concave or cupped surface, as clearly indicated in Fig. 5, the diameter of which concave surface is slightly less than the diameter of the die. The concave or cupped surface of the pad 90 and the rounded surface of the end of the ram 47 coöperate to form the closed front end of the glass lamp bulb 91, illustrated in Fig. 10, as more fully hereinafter described. Obviously the end of the ram 47 and the pad 90 may be given any desired shape or form, depending upon the ultimate end shape desired on the glass article which is being drawn.

Figure 8:
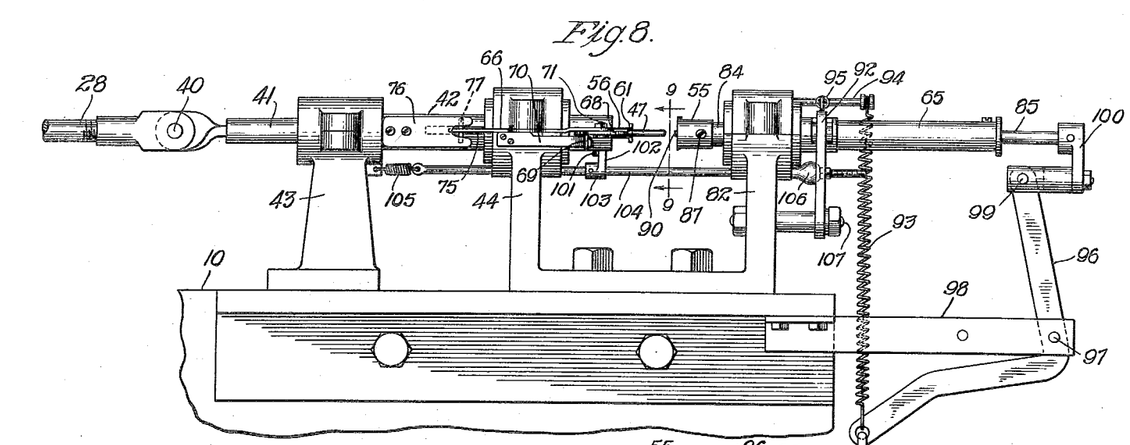
Fig. 8 is an enlarged front elevation illustrating in detail the apparatus utilized for operating the ram and die and its associated mechanism.

The cylindrical rod 85, with which the metallic pad 90 is integral, normally protrudes about one-eighth of an inch beyond the front face of the die 55. The pad is held in this position by a spring pressed pawl 92 which rides in a recess in the rod 85 when said rod is in its normal position, as indicated in Figs. 3 and 8. A spiral spring 93 secured to a rearwardly extending pin 94 integral with the mounting bracket 82, to which pin the spring 95 controlling the pawl 92 is also attached, tends to retract or withdraw the pad 90 from its normal position. The other end of the spiral spring 93 is secured to a bell crank 96, pivoted at 97 to a rearwardly extending arm 98 secured to the base 10 of the machine, and at 99 to a bracket 100 rigidly secured to the rod 85. As the spring 93 is normally under tension, it will be obvious that it tends to turn the bell crank 96 about its pivot 97 and thus move the bracket 100 to the right, thereby tending to retract the rod 85 and the pad 90, to which the bracket is attached. This retraction of the pad 90 and rod 85 is prevented as hereinbefore described by the spring operated pawl 92.

Secured to the lower surface of the sleeve 49 is a screw or any other suitable downwardly extending arm 101 which coöperates with an upwardly extending arm 102 secured to a sleeve 103 rigidly secured to a rod 104. The rod 104 carries at one end a spiral spring 105, the other end of which is attached to the mounting bracket 43, and at its other end carries the protruding spherical projection or knob 106 which coöperates with a semi-circular depression in the pawl 92. When the sleeve 49 and ram 47 are advanced to the position at which it is desired to retract the pad 90, which is illustrated in Fig. 5, the downwardly depending arm 101 contacts with the upwardly extending arm 102 and advances the rod 104 with the sleeve 49, thereby advancing the spherical knob 106 which in turn rotates the pawl 92 about its pivot 107. This will withdraw the pawl 92 from the recess cut in the cylindrical rod 85 and permit the spring 93 to retract the pad 90 to the position illustrated in Fig. 4, in which it is completely removed from the path of the ram 47. When the ram has been retracted from the die, the pad 90 is returned to its normal position, indicated in Figs. 3 and 8, by depressing the foot treadle 108 which will rotate the bell crank 96 about its pivot, through the agency of the rod 109, against the tension exerted by the spring 93 and thereby move the rod 85 forward until the pawl 92 is again drawn in the recess in the rod 85 by its coöperating spring 95.

In the production of the thin walled glass lamp bulbs 91, the punch or ram 47, the sleeve 49, the die 55, and the pad 90 must be maintained hot for successful operation. The temperature to which these parts should be heated cannot be definitely specified, since this will vary, depending upon the type of metal from which the tools are constructed and the grade of polish which the tools have received. However, for the most successful operation of the apparatus these parts should be heated to the highest temperature permissible. This temperature may be accurately determined for any particular set of tools, since the glass will adhere to the tools if they are heated above this permissible maximum temperature. Obviously the temperature of the tools should be maintained as close as possible to this prescribed maximum for the most satisfactory operation of the process and the apparatus.

In the operation of the apparatus, the operator first places a globule of very hot plastic glass in front of the pad 90. This is preferably done by heating the end of a glass rod to the highest temperature possible without actually causing the glass to become fluid and run off from the end of the rod. The feeding of the glass to the pad is not necessarily limited to this method, however, and many other methods are contemplated. Thus for instance, a continuous feed might be arranged whereby a globule of plastic glass is automatically and intermittently delivered from a heating furnace above the machine. When the glass is properly located in front of the pad the operator will trip the treadle 29. This will cause a complete rotation of the crank 27, as hereinbefore described. The complete rotation of the crank will cause a full reciprocation of the rod 41. As the rod 41 advances, it carries with it the ram 47 which on meeting the plastic glass will penetrate said glass and push it forward against the pad. When the ram 47 has penetrated the plastic glass to a depth so that the thickness of glass separating the ram 47 and the pad 90 is equal to the wall thickness of the end of the glass bulb, the rod 104 is advanced, as hereinbefore described, and releases the pad so that it will withdraw out of the path of the ram.

The retraction of the pad 90 is accomplished very rapidly, and consequently the end of a lamp bulb is held between the end surfaces of the ram 47 and the pad 90 for an exceedingly short interval of time, and consequently rapid cooling of the formed portion of the lamp bulb does not occur due to a prolonged contact of said formed portion between the adjoining portions of the forming tools. However, these surfaces remain in contact with the end portion of the plastic glass long enough to give it the definite shape desired. In other words, the pad determines the amount of glass that will advance through the die 55 ahead of the ram 47. Obviously the very thin section of glass confined between the pad 90 and the ram 47 will cool somewhat and solidify slightly on account of being held between the forming surfaces of the pad and ram. However, this cooling effect will not be sufficiently great to strain the formed portion of the glass and cause cracking. The amount of this cooling is an important factor in the operation of the process and the apparatus and the machine must be adjusted to rapidly retract the pad from the formed end of the glass at the moment that the required amount of cooling has taken place.

After the pad 90 has been retracted, the ram 47 will continue to move through the die, and plastic glass from the bulk 110 will be drawn through the die and around the punch. The sleeve 49 will move forward with the rod 41 when the pin 58 strikes the right end of the slot 57, after which the sleeve will travel with the ram and will enter the opening 54 in the die 55 when the proper amount of plastic glass from the bulk 110 has been drawn through the die. Since the forward protruding cylindrical end 56 of the sleeve 49 fits snugly in the opening 54 of the die 55, it will, upon entering the die, shear off the plastic glass which has been passed through the die from the mass 110 which remains outside of the die. The glass bulb 91 which has passed through the die is therefore severed or cut off from the plastic mass 110 by the forwardly protruding cylindrical surface 56 of the sleeve 49. In thus cutting off the remainder of the plastic glass 110, the portion which remains will encircle the outer peripheral surface 56 of the sleeve 49. The forwardly projecting cylindrical surface 56 of the sleeve will pass in through the die to a distance of about one-eighth of an inch, at which time the rod 41 will have reached the end of the forward stroke of the reciprocation. As the rod 41 is retracted on the backward stroke, the pawl 68, as hereinbefore described, will engage the sleeve 49 and maintain said sleeve in a stationary position while the punch or ram 55 is retracted or drawn out from the glass bulb formed thereon. Said sleeve will remain stationary until said glass bulb 91 is completely stripped from the ram 47, at which time the lever 66 will ride in the recess in the rod 41, thereby allowing the sleeve 49 to retract with the ram, as hereinbefore described.

The temperature of the lamp bulb 91 when it is stripped from the ram 47 is such that said bulb is still soft and pliable, the operation of drawing, forming, and stripping the bulb being performed so rapidly that said bulb does not have sufficient time to cool very materially. Since the bulb is still soft and pliable, it is not permissible that said bulb be dropped any great distance, inasmuch as the impact due to the fall will deform said bulb. For this reason an inclined surface of any suitable character is located directly beneath the opening 88, said inclined surface being preferably covered with some soft material to break the force of the impact. A suitable receiving receptacle is located at the far end of said inclined surface. With this arrangement, when the bulb is stripped from the punch 47 it will fall through the opening 88 upon the elevated portion of the inclined surface and roll down said surface into the receiving receptacle. During the time that the bulb rolls down the inclined surface, it will be sufficiently cooled so that when it reaches the receiving receptacle the glass walls thereof will have hardened sufficiently to eliminate any possibility of distortion.

As hereinbefore described, the cylindrical projecting portion 56 of the sleeve 49 serves the double purpose of severing the formed glass bulb 91 from the excess plastic glass of the mass 110 not ultilized in the forming operation and likewise serves as a means for stripping the finished glass bulb from the ram 47. As the ram and sleeve continue to recede out of the punch, the bifurcated end 61 of the lever 60, under the influence of the spring 63, will ride over the peripheral surface of said sleeve and ram. This bifurcated arm 61 serves to strip from said sleeve and ram that portion of the plastic glass mass 110 which did not enter the die to form the glass bulb and which will encircle the sleeve and ram after the finished lamp bulb 91 has been severed from the plastic glass mass 110. This superfluous glass mass which encircles the sleeve is dropped into a suitable receiving receptacle when it is pushed from the end of the ram by the bifurcated ends of the arms 61. When the rod 41 has reached the end of its backward stroke the operator will operate the treadle 108, thereby resetting the pad 90, and the apparatus is then in condition for the forming of a second lamp bulb in a manner similar to that just described.
It will be obvious from the construction of the machine that the reciprocation of the rod 41 is very rapidly performed, a complete reciprocation consuming about two seconds. Such being the case, it will be evident that the operations above described are very rapidly performed and that consequently the glass is in contact with the forming tools for such a very short interval of time that excessive cooling is not permissible, and consequently cracking of the glass bulb on account of such cooling is avoided. By the use of the process and the apparatus herein described, thin walled glass lamp bulbs 91 of the type shown in Fig. 10 can be very rapidly formed and held to very exacting dimensions.

Obviously the process of and apparatus for drawing glass bulbs for miniature lamps, the specific embodiment of the invention herein illustrated and described, is but one of the many physical expressions of this invention, and the same is not limited thereby, the scope of said invention being set forth in the following claims.

What is claimed is:

1. The process of drawing glass, which consists in subjecting plastic glass to the joint action of a punch and die, and then stripping the article drawn from said punch before it has been cooled sufficiently by said punch and die to cause cracking.

2. The process of drawing and forming thin walled glass articles, which consists in drawing plastic glass through a die and over a ram or punch.

3. The process of drawing and forming thin walled glass articles, which consists in shaping the end of the article between a punch or ram and a retractible pad, retracting the pad, and then drawing the plastic glass through a die and over the punch.

4. The process of drawing and forming thin walled glass articles, which consists in shaping the plastic glass to form the end of the article between a punch or ram and retractible pad, advancing the pad and punch and interposed plastic glass through a die, retracting the pad immediately after the plastic glass is formed about the end of the ram to the desired thickness, then drawing the plastic glass through said die and over said ram, and finally rapidly stripping the formed article from said ram before it has been sufficiently cooled thereby to cause cracking.

5. The process of drawing and forming thin walled glass articles, which consists in shaping plastic glass to form the end of the article between a punch or ram and retractible pad, advancing the pad, punch, and interposed plastic glass through a die, retracting the pad immediately after the plastic glass is formed about the end of the ram to the desired thickness, then drawing the plastic glass through the die and over said ram, then severing the formed article from the excess of plastic glass, and finally rapidly stripping the formed article from said ram before it has been sufficiently cooled thereby to cause cracking.

6. The process of drawing and forming thin walled glass articles, which consists in shaping plastic glass to form the end of the article between a punch or ram and retractible pad, advancing the pad, punch, and interposed plastic glass through a die, retracting the pad immediately after the plastic glass is formed about the end of the ram to the desired thickness, then drawing the plastic glass through the die and over said ram, then severing the formed article from the excess of plastic glass, then stripping the formed article from said ram before it has been sufficiently cooled thereby to cause cracking, and finally stripping the excess of plastic glass from said sleeve.

7. In a device of the character described, in combination, a reciprocating ram, a die, a forming pad coöperating with said ram means to advance said ram and pad through said die, and means to retract said pad out of the path of said ram immediately after the ram has formed the plastic glass about its end to the thickness desired.

8. In a device for drawing and forming thin walled glass articles, the combination with a reciprocating ram and a die, of a forming pad coöperating with said ram for shaping plastic glass therebetween to form the end of said article, means to advance said ram, pad, and the interposed plastic glass through said die, and means to retract said pad from contact with said glass immediately after the ram has formed the plastic glass about its end to the thickness desired.

9. In a device for drawing and forming thin walled glass articles, the combination with a reciprocating ram and a die, of a forming pad coöperating with said ram for shaping plastic glass therebetween to form the end of said article, means to advance said ram, pad, and the interposed plastic glass through said die, means to retract said pad from contact with said glass immediately after the ram has formed said glass about its end to the thickness desired the plastic glass being drawn through said die and over said ram, and means to sever the formed article from the excess plastic glass not drawn through the die.

10. In a device for drawing and forming thin walled glass articles, the combination with a reciprocating ram and a die, of a forming pad coöperating with said ram for shaping plastic glass therebetween to form the end of said article, means to advance said ram, pad, and the interposed plastic glass through said die, means to retract said pad from contact with said glass immediately after the ram has formed said glass about its end to the thickness desired the plastic glass being drawn through said die and over said ram, and a sleeve shaped to fit said die inclosing said ram and advancing therewith which serves to sever the formed article from the excess plastic glass not drawn through said die.

11. In a device for drawing and forming thin walled glass articles, the combination with a reciprocating ram and a die, of a forming pad coöperating with said ram for shaping the plastic glass therebetween to form the end of said article, means to advance said ram, pad, and the interposed plastic glass through said die, means to retract said pad from contact with said glass immediately after the ram has formed said glass about its end to the thickness desired the plastic glass being drawn through said die and over said ram, and means to sever the formed article from the excess plastic glass not drawn through the die said means also serving to strip the formed article from said ram as it is withdrawn from said die.

12. In a device for drawing and forming thin walled glass articles, the combination with a reciprocating ram and a die, of a forming pad coöperating with said ram for shaping the plastic glass therebetween to form the end of said article, means to advance said ram, pad, and the interposed plastic glass through said die, means to retract said pad from contact with said glass immediately after the ram has formed said glass about its end to the thickness desired the plastic glass being drawn through said die and over said ram, means to sever the formed article from the excess plastic glass not drawn through the die said means also serving to strip the formed article from said ram as it is withdrawn from said die, and means to automatically remove the excess plastic glass from said severing and stripping means.

13. In a device for drawing and forming thin walled glass articles, the combination with a reciprocating ram and a die, of a forming pad coöperating with said ram for shaping plastic glass therebetween to form the end of said article, means to advance said pad, ram, and the interposed plastic glass through said die, means to retract said pad from contact with said glass immediately after the ram has formed said glass about its end to the thickness desired, the plastic glass being drawn through said die and over said ram, a sleeve shaped to fit said die which incloses said ram and advances therewith and serves to sever the formed article from the excess plastic glass not drawn through the die, and means to withdraw said ram from said die independently of said sleeve whereby said article is stripped from said ram by said sleeve.

14. In a device for drawing and forming thin walled glass articles, the combination with a reciprocating ram and a die, of a forming pad coöperating with said ram for shaping plastic glass therebetween to form the end of said article, means to advance said pad, ram, and the interposed plastic glass through said die, means to retract said pad from contact with said glass immediately after the ram has formed said glass about its end to the thickness desired the plastic glass being drawn through said die and over said ram, a sleeve shaped to fit said die which incloses said ram and advances therewith and serves to sever the formed article from the excess plastic glass not drawn through the die, means to withdraw said ram from said die independently of said sleeve whereby said article is stripped from said ram by said sleeve, and means automatically operated to straddle said ram and sleeve on the return stroke of each reciprocation whereby the excess glass is stripped therefrom.

15. In a device for drawing and forming thin walled glass articles, the combination with a reciprocating ram and a die, of a forming pad coöperating with said ram for shaping plastic glass therebetween to form the end of said article, means to advance said pad, ram, and the interposed plastic glass through said die, means to retract said pad from contact with said glass immediately after the ram has formed said glass about its end to the thickness desired the plastic glass being drawn through said die and over said ram, a sleeve shaped to fit said die which incloses said ram and advances therewith and serves to sever the formed article from the excess plastic glass not drawn through the die, means to withdraw said ram from said die independently of said sleeve whereby said article is stripped from said ram by said sleeve, means automatically operated to straddle said ram and sleeve on the return stroke of each reciprocation whereby the excess glass is stripped therefrom, and means coöperating with said ram to withdraw said sleeve from said die after the article is stripped from said ram.

16. In a device for drawing and forming thin walled glass articles, the combination with a reciprocating ram and a die, of a forming pad coöperating with said ram for shaping plastic glass therebetween to form the end of said article, means to advance said ram, pad, and the interposed plastic glass through said die, means to retract said pad from contact with said glass immediately after the ram has formed said glass about its end to the thickness desired the plastic glass being drawn through said die and over said ram, means to sever the formed article from the excess plastic glass not drawn through the die, means to strip the formed article from said ram as it is withdrawn from said die, and means to advance the pad through said die after the return stroke of each reciprocation of said ram.

17. In a device for drawing and forming glass vials, the combination with a reciprocating ram and a die, of a forming pad cooperating with said ram for shaping the plastic glass therebetween to form the closed end of said vial, means to advance said ram, pad, and the interposed plastic glass through said die, automatic means operated to retract said pad from contact with said glass immediately after the ram has formed said glass about its end to the thickness desired, and means automatically operated to sever the formed vial from the excess plastic glass and strip said formed vial from said ram.

18. In a device for drawing and forming glass vials, the combination with a reciprocating ram and die, of means operated to form the closed end of said vial about the end of said ram, means for reciprocating said ram to draw plastic glass through said die and over said ram, and means operated to sever the excess plastic glass from said formed vial when a desired length thereof has been drawn through the die.

In witness whereof, we have hereunto subscribed our names.

HARRY TRISTRAM BELLAMY.
JESSE CONRAD SMITH.